United States Patent
Yasuda et al.

(10) Patent No.: US 10,270,084 B2
(45) Date of Patent: Apr. 23, 2019

(54) LITHIUM ION BATTERY, NEGATIVE ELECTRODE FOR LITHIUM ION BATTERY, BATTERY MODULE AUTOMOBILE, AND POWER STORAGE DEVICE

(71) Applicant: Hitachi Chemical Company, LTD., Tokyo (JP)

(72) Inventors: Akira Yasuda, Tokyo (JP); Takeshi Nishiyama, Tokyo (JP); Kenji Hara, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 24 days.

(21) Appl. No.: 15/558,437

(22) PCT Filed: Mar. 9, 2016

(86) PCT No.: PCT/JP2016/057323
§ 371 (c)(1),
(2) Date: Sep. 14, 2017

(87) PCT Pub. No.: WO2016/147976
PCT Pub. Date: Sep. 22, 2016

(65) Prior Publication Data
US 2018/0062157 A1 Mar. 1, 2018

(30) Foreign Application Priority Data
Mar. 16, 2015 (JP) .................................. 2015-052079

(51) Int. Cl.
*H01M 4/00* (2006.01)
*H01M 4/133* (2010.01)
(Continued)

(52) U.S. Cl.
CPC ............ *H01M 4/133* (2013.01); *H01M 4/131* (2013.01); *H01M 4/505* (2013.01); *H01M 4/525* (2013.01);
(Continued)

(58) Field of Classification Search
CPC ...... H01M 4/133; H01M 4/131; H01M 4/505; H01M 4/525; H01M 4/587; H01M 10/0525; H01M 2220/10; H01M 2220/20
See application file for complete search history.

(56) References Cited

U.S. PATENT DOCUMENTS 9,640,832 B2   5/2017 Washizuka
2006/0078796 A1   4/2006 Ozaki et al.
(Continued)

FOREIGN PATENT DOCUMENTS

JP   H06-187987 A   7/1994
JP   2008-041465 A   2/2008
(Continued)

OTHER PUBLICATIONS

International Search Report for PCT/JP2016/057323 dated Jun. 7, 2016; English translation submitted herewith (5 pages).

*Primary Examiner* — Jane J Rhee
(74) *Attorney, Agent, or Firm* — Fitch, Even, Tabin & Flannery, LLP

(57) ABSTRACT

An object is to provide a lithium ion battery excellent in input/output characteristics, cycle life characteristics, and safety. The lithium ion battery is a lithium ion battery including, in a battery container, an electrolyte solution and an electrode group in which a positive electrode and a negative electrode are disposed through a separator. A lithium-nickel-manganese-cobalt composite oxide having a layered crystal structure is contained as a positive electrode active material, an easily graphitizable carbon is contained (Continued)

as a negative electrode active material, a weight of the easily graphitizable carbon heated at 550° C. in dry air flow in thermogravimetric analysis is equal to more than 75% of a weight of the easily graphitizable carbon heated at 25° C. therein, and a weight of the easily graphitizable carbon heated at 650° C. therein is equal to or less than 20% of the weight of the easily graphitizable carbon heated at 25° C. therein.

9 Claims, 1 Drawing Sheet

(51) Int. Cl.
*H01M 4/505* (2010.01)
*H01M 4/525* (2010.01)
*H01M 4/587* (2010.01)
*H01M 10/0525* (2010.01)
*H01M 4/131* (2010.01)

(52) U.S. Cl.
CPC ....... *H01M 4/587* (2013.01); *H01M 10/0525* (2013.01); *H01M 2220/10* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2010/0214722 A1 | 8/2010 | Masaki et al. |
| 2011/0160038 A1 | 6/2011 | Fujii et al. |
| 2013/0089782 A1 | 4/2013 | Seung et al. |
| 2013/0302700 A1 | 11/2013 | Washizuka |
| 2015/0263376 A1 | 9/2015 | Kondo et al. |
| 2015/0263385 A1 | 9/2015 | Yoon et al. |

FOREIGN PATENT DOCUMENTS

| | | |
|---|---|---|
| JP | 2008-195559 A | 8/2008 |
| JP | 2009-013012 A | 1/2009 |
| JP | 2012079566 A | 4/2012 |
| JP | 5168593 B2 | 3/2013 |
| JP | 2013-065577 A | 4/2013 |
| JP | 2014-035877 A | 2/2014 |
| JP | 5578341 B2 | 8/2014 |
| JP | 2014192142 A | 10/2014 |
| WO | 2010/032407 A1 | 3/2010 |
| WO | 2014/081237 A1 | 5/2014 |
| WO | 2014/133070 A1 | 9/2014 |
| WO | 2015/019994 A1 | 2/2015 |

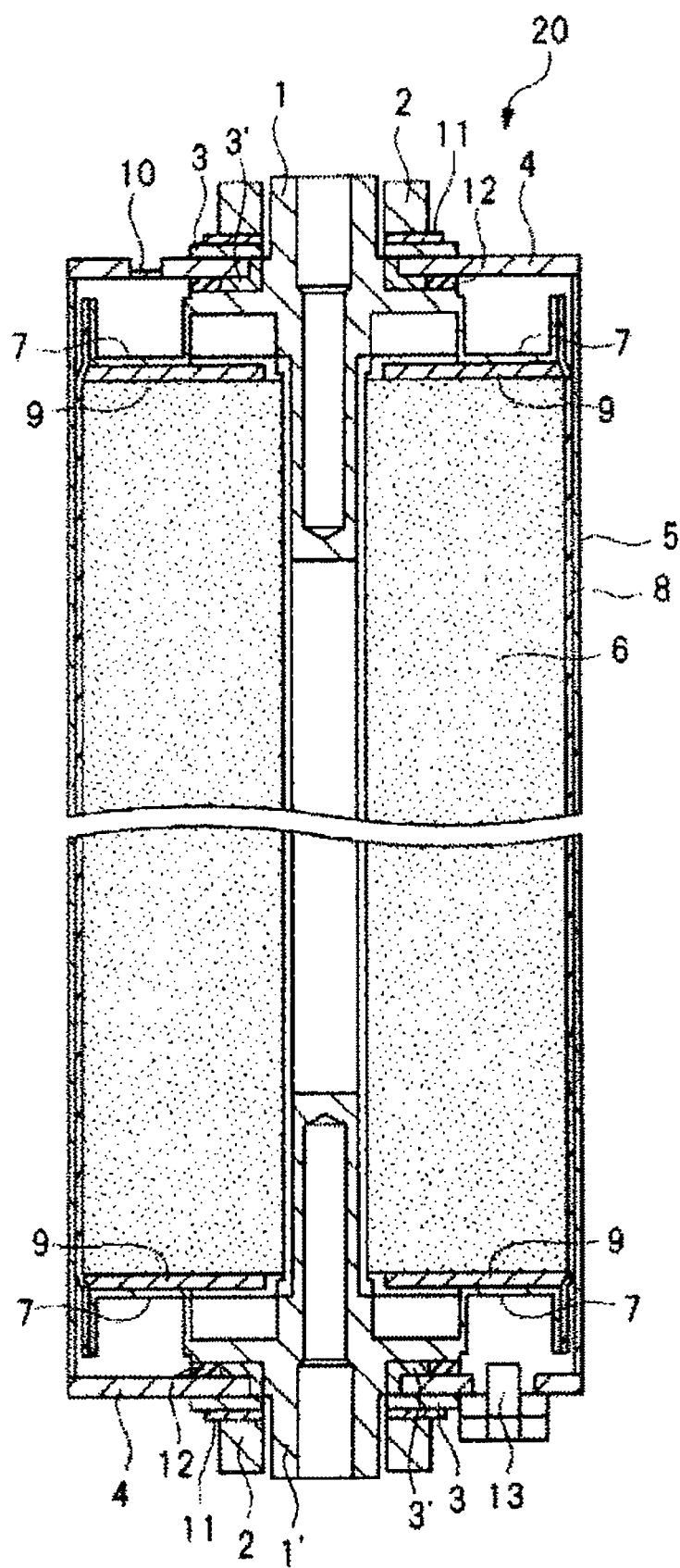

LITHIUM ION BATTERY, NEGATIVE ELECTRODE FOR LITHIUM ION BATTERY, BATTERY MODULE AUTOMOBILE, AND POWER STORAGE DEVICE

CROSS-REFERENCE TO RELATED APPLICATIONS

This application is a U.S. national phase application filed under 35 U.S.C. § 371 of International Application No. PCT/JP2016/057323, filed Mar. 9, 2016, designating the United States, and claims priority from Japanese Patent Application No. 2015-052079, filed Mar. 16, 2015, and the complete disclosures of which applications are hereby incorporated herein by reference in their entirety for all purposes.

TECHNICAL FIELD

The present invention relates to a lithium ion battery.

BACKGROUND ART

Patent Document 1 (Japanese Patent Application Laid-open Publication No. 2008-041465) suggests such a combination as selecting a lithium nickel cobalt manganese composite oxide as an active material to be used for a positive electrode and as selecting an easily graphitizable carbon as an active material to be used for a negative electrode, in order to achieve a high input/output density and excellent cycle characteristics.

Patent Document 2 (Japanese Patent No. 5168593) suggests the combination of the active material to be used for the positive electrode and the active material to be used for the negative electrode, which are similar to those of Patent Document 1, in order to ensure the cycle characteristics and storage characteristics.

Further, Patent Document 3 (Japanese Patent No. 5578341) suggests the combination of the active material to be used for the positive electrode and the active material to be used for the negative electrode, which are similar to those of Patent Document 1, in order to improve the input/output characteristics at a low temperature.

RELATED ART DOCUMENTS

Patent Documents

Patent Document 1: Japanese Patent Application Laid-open Publication No. 2008-041465
Patent Document 2: Japanese Patent No. 5168593
Patent Document 3: Japanese Patent No. 5578341

SUMMARY OF THE INVENTION

Problems to be Solved by the Invention

An object of the present invention is to increase the input/output characteristics, capacity, and life of a lithium ion battery formed by such a combination as selecting a lithium nickel cobalt manganese composite oxide as an active material to be used for a positive electrode and as selecting an easily graphitizable carbon as an active material to be used for a negative electrode particularly by selecting a specific easily graphitizable carbon, and is also to ensure the safety.

Means for Solving the Problems

In order to solve the above-described problems, the lithium ion battery according to the present invention includes the following configurations.

<1> In a lithium ion battery including, in a battery container, an electrolyte solution and an electrode group in which a positive electrode and a negative electrode are disposed through a separator, a lithium-nickel-manganese-cobalt composite oxide having a layered crystal structure is included as a positive electrode active material, an easily graphitizable carbon is included as a negative electrode active material, a weight of the negative electrode active material heated at 550° C. in dry air flow in thermogravimetric analysis is equal to or more than 75% of a weight heated at 25° C. therein, and a weight heated at 650° C. therein is equal to or less than 20% of the weight heated at 25° C. therein.

Here, the heat weight is a sample weight obtained when the sample is heated at a temperature increase rate of 1° C./min from 25° C. under dry air circulated at 300 ml/min to reach each designed temperature while using alumina as a reference.

<2> In the lithium ion battery described in the item <1>, the easily graphitizable carbon has a median particle diameter (d50) of 5 μm to 30 μm on volumetric basis as measured with a laser diffraction particle size distribution meter, a specific surface area of 1.0 $m^2/g$ to 5.0 $m^2/g$ as obtained by a nitrogen adsorption measurement method, and a carbon dioxide adsorption amount of 0.01 $cm^3/g$ to 4.0 $cm^3/g$ until a relative pressure of 0.03 (at 273 K).

<3> In the lithium ion battery described in the item <2>, the specific surface area as obtained by the nitrogen adsorption measurement method is from 1.3 $m^2/g$ to 4.0 $m^2/g$.

<4> In the lithium ion battery described in the item <2> or <3>, the carbon dioxide adsorption amount until the relative pressure of 0.03 (at 273 K) is 0.05 $cm^3/g$ to 1.5 $cm^3/g$.

<5> In a negative electrode for a lithium ion battery including an easily graphitizable carbon as a negative electrode active material, a weight of the negative electrode active material heated at 550° C. in dry air flow in thermogravimetric analysis is equal to or more than 75% of a weight heated at 25° C. therein, and a weight of the same heated at 650° C. is equal to or less than 20% of the weight heated at 25° C. therein.

<6> A lithium ion battery including the negative electrode for the lithium ion battery described in the item <5>.

<7> A battery module configured to collect a plurality of lithium ion batteries (secondary batteries) described in any one of the items <1> to <4> and <5>.

<8> An automobile on which the battery module described in the item <7> is mounted.

<9> A power storage device on which the battery module described in the item <8> is mounted.

The present invention intentionally aims at high input/output characteristics, high capacity, and long battery life by selecting a lithium-nickel-manganese-cobalt composite oxide having a layered crystal structure.

The longer battery life can be achieved than a spinel-based manganese material represented by the chemical formula of $LiMn_2O_4$ because an elution amount of Mn is small. Further, because of a lithium-nickel-manganese-cobalt composite oxide having a layered crystal structure obtained by substituting some of Co of lithium cobaltite having a layered crystal structure represented by the chemical formula of $LiCoO_2$ with Ni and Mn, the concern in the safety in an attempt to increase the capacity by substituting all Co with Ni is eliminated, and decrease in the capacity caused by substituting all Co with Mn is eliminated. In the specific easily graphitizable carbon, the crystallinity in the vicinity of the particle surface can be controlled, and therefore, the lyophilic property at the interface between the easily graphitizable carbon and the electrolyte solution is improved. As a result, the combination with lithium-nickel-manganese-cobalt composite oxide having the layered crystal structure leads to further improvement in the input/output characteristics, capacity, and life of the battery.

Further, the easily graphitizable carbon has features of a median particle diameter (d50) of 5 μm to 30 μm on volumetric basis as measured with a laser diffraction particle size distribution meter, a specific surface area of 1.0 $m^2$/g to 5.0 $m^2$/g as obtained by a nitrogen adsorption measurement method, and a carbon dioxide adsorption amount (273 K) of 0.01 $cm^3$/g to 4.0 $cm^3$/g until a relative pressure of 0.03. When the specific surface area is within the above-described range, a reacting area between the electrode and the electrolyte solution is small while the input/output characteristics are maintained. Thus, an internal resistance can be decreased. Further, when the value of the carbon dioxide adsorption amount is small, the resistance can be decreased since formation of a passivation film on an active material surface and resolution of the electrolyte solution are suppressed while the input/output characteristics are maintained. Therefore, the cycle characteristics can be improved.

Effects of the Invention

As described above, in the present invention, the positive electrode contains the lithium-nickel-manganese-cobalt composite oxide having a layered crystal structure as the positive electrode active material, the negative electrode contains the easily graphitizable carbon as the negative electrode active material, the negative electrode active material has a mass at 550° C. in air flow, which is equal to or more than 75% of a mass of the negative electrode active material at 25° C., and a mass of the negative electrode active material at 650° C. is set equal to or less than to 20% of the mass at 25° C. therein, so that the crystallinity in the vicinity of the particle surface can be controlled, and therefore, the fitting between the easily graphitizable carbon and the electrolyte solution is improved. As a result, the input/output characteristics, cycle life characteristics, and safety can be further improved.

BRIEF DESCRIPTIONS OF THE DRAWINGS

FIG. 1 is a cross-sectional view of the lithium ion battery of the embodiment of the present invention.

BEST MODE FOR CARRYING OUT THE INVENTION

Hereinafter, an embodiment of the present invention will be described with reference to the drawings and others. The following description shows specific examples of the content of the present invention, and the present invention is not limited to such description and can be altered or modified variously within the range of the technical idea disclosed in the present specification by those who skilled in the art. In a range of a numerical value expressed by using a term "to" in the present specification, numerical values described before and after the term "to" are included as the minimum value and the maximum value, respectively.

1. <Positive Electrode>

The present embodiment includes the following positive electrode that is applicable to a lithium ion battery having a high capacity and high input/output power. The positive electrode (positive electrode plate) of the present embodiment is made of a current collector and a positive electrode mixture formed on an upper part of the current collector. The positive electrode mixture is a layer containing at least a positive electrode active material which is formed on the current collector.

The positive electrode active material includes a lithium-nickel-manganese-cobalt composite oxide (hereinafter, referred to as NMC in some cases) having a layered crystal structure. The NMC has a high capacity and excellent safety.

From the viewpoint of the high capacity of the battery, the contained amount of the NMC is preferably equal to or more than 65% by mass of a total amount of the positive electrode mixture, more preferably 70% by mass of the same, and still more preferably 80% by mass of the same. From the practical viewpoint, the contained amount is preferably equal to or less than 98% by mass of the same.

As the NMC, a substance expressed by the following composition formula (Chemical Formula 1) is preferably used.

$$Li_{(1+\delta)}Mn_xNi_yCo_{(1-x-y-z)}M_zO_2 \qquad \text{(Chemical Formula 1)}$$

In the composition formula (Chemical Formula 1), a term "(1+δ)" represents a composition ratio of Li (lithium), a term "x" represents a composition ratio of Mn (manganese), a term "y" represents a composition ratio of Ni (nickel), and a term (1−x−y−z) represents a composition ratio of Co (cobalt). A term "z" represents a composition ratio of an element "M". The composition ratio of O (oxygen) is 2. It is assumed that "−0.15<δ<0.15", that "0.1<x≤0.5", that "0.6<x+y+z≤1.0", and that "0≤z≤0.1". When the element M contains this chemical formula 1, at least one element selected from the group constituting of Ti (titanium), Zr (zirconium), Nb (niobium), Mo (molybdenum), W (tungsten), Al (aluminum), Si (silicon), Ga (gallium), Ge (germanium), and Sn (tin) can be selected. In the following examples, $LiMn_{1/3}Ni_{1/3}Co_{1/3}O_2$ under a condition "z=0" is used.

Subsequently, the positive electrode mixture and the current collector will be described in detail. The positive electrode mixture contains a positive electrode active material, a binder, and others, and is formed on the current collector. Although a formation method has no limitation, the positive electrode mixture is formed as, for example, follows. A positive electrode active material, a binder, and other materials such as a conductive material and a thickener to be used if necessary are mixed by dry mixing to form a sheet, and this sheet is pressure-bonded to a current collector (dry method). Alternatively, a positive electrode active material, a binder, and other materials such as a conductive material and a thickener to be used if necessary are dissolved or dispersed in a dispersion solvent to form a slurry, and this slurry is applied onto a current collector and is dried thereon (wet method).

As described above, the lithium-nickel-manganese-cobalt composite oxide (NMC) having a layered crystal structure is used as the positive electrode active material. This material is used in a powdery (granular) form and is mixed.

As a particle shape of the positive electrode active material of the NMC, various shapes such as a massive shape, a polyhedral shape, a spherical shape, an oval spherical shape, a tabular shape, a needle shape, and a columnar shape can be used.

The median particle diameter (d50) of the particles of the positive electrode active material of the NMC (the median particle diameter (d50) of secondary particles when primary particles are aggregated to form secondary particles) can be adjusted in the following range. From the viewpoint of the tap density (filling property) and the mixing property with other materials in the electrode formation, the median particle diameter is preferably 1 to 30 µm, more preferably 3 to 25 µm, and still more preferably 5 to 15 µm. Note that the median particle diameter (d50) means a particle size at an integrated value of 50% in a particle size distribution obtained by a laser diffraction/scattering method. For example, the median particle diameter is a value measured as "d50" (median diameter) by using a particle size distribution measuring apparatus using a laser light scattering method (e.g., SALD-3000, produced by Shimadzu Corporation).

When the median particle diameter is equal to or more than the lower limit, the tap density (filling property) is not decreased, and therefore, a desired tap density is easily obtained. When the median particle diameter is equal to or less than the upper limit, it does not take time to diffuse lithium ions in the particles, and therefore, an excellent battery performance is obtained. Further, when the median particle diameter is equal to or less than the upper limit, the mixing property with other materials such as a binder and a conductive material in the electrode formation is favorable.

Accordingly, when this mixture is formed into a slurry form and is applied, the slurry can be uniformly applied, and therefore, problems such as a linear crack do not arise.

An average particle diameter of primary particles obtained when the primary particles are aggregated to form secondary particles is in the following range. The lower limit of the range is preferably equal to or more than 0.01 µm, more preferably 0.05 µm, and still more preferably 0.08 µm. The average particle diameter is particularly preferably equal to or more than 0.1 µm. The upper limit of the range is preferably equal to or less than 3 µm, more preferably 2 µm, and still more preferably 1 µm. It is particularly preferably equal to or less than 0.6 µm.

When the average particle diameter is equal to or less than the upper limit, the spherical secondary particles are easily formed, and therefore, the battery performance such as an excellent output performance is obtained because of the high tap density (filling property) and the high specific surface area.

Further, when the average particle diameter is equal to or more than the lower limit, charge and discharge characteristics with high reversibility are obtained because of high crystallinity.

The range of the BET specific surface area of the particles of the positive electrode active material of the NMC is preferably from 0.2 m$^2$/g to 4.0 m$^2$/g, more preferably from 0.3 m$^2$/g to 2.5 m$^2$/g, and still more preferably from 0.4 m$^2$/g to 1.5 m$^2$/g.

When the BET specific surface area is equal to or more than 0.2 m$^2$/g, an excellent battery performance is obtained. When the BET specific surface area is equal to or less than 4.0 m$^2$/g, the tap density is easily increased, and therefore, the mixing property with other materials such as a binder and a conductive material is favorable. The BET specific surface area is a specific surface area (area per gram unit) obtained by the BET method.

As the conductive material for the positive electrode, carbonaceous materials such as a metal material, a graphite, and an amorphous carbon are cited. Note that one type of them may be used, or combination of two or more types of them may be used.

The range of the contained amount of the conductive material relative to the mass of the positive electrode mixture is as follows. The range of the contained amount of the conductive material relative to the mass of the positive electrode mixture is preferably from 0.01 to 50% by mass, more preferably from 0.1 to 30% by mass, and still more preferably from 1 to 15% by mass. When the contained amount is equal to or more than 0.1% by mass, sufficient electrical conductivity can be obtained. When the contained amount is equal to or less than 50% by mass, decrease in the battery capacity can be suppressed.

The binder for the positive electrode active material has no particular limitation. When the positive electrode mixture is formed by the coating method, a material having favorable solubility or dispersibility in a dispersion solvent is selected. Specific materials are resin-based polymers such as polyethylene, polypropylene, polyethylene terephthalate, and polyimide; rubber polymers such as styrene-butadiene rubber (SBR); fluorine-based polymers such as polyvinylidene fluoride (PVdF), polytetrafluoroethylene, and fluorinated polyvinylidene fluoride; polymer compositions having ion conductivity of alkali metal ions (particularly lithium ions); and others. Note that one type of them may be used, or combination of two or more types of them may be used.

From the viewpoint of the stability of the positive electrode, fluorine-based polymers such as polyvinylidene fluoride (PVdF) or polytetrafluoroethylene-vinylidene fluoride copolymer is preferably used.

The ranges of the contained amount of the binder relative to the mass of the positive electrode mixture is as follows.

The range of the contained amount of the binder relative to the mass of the positive electrode mixture is preferably from 0.1 to 60% by mass, more preferably from 1 to 40% by mass, and still more preferably from 3 to 10% by mass.

When the contained amount of the binder is equal to or more than 0.1% by mass, the positive electrode active material can be sufficiently bound, so that a sufficient mechanical strength of the positive electrode active material is obtained, and therefore, excellent battery performances such as cycle characteristics are obtained. When the contained amount is equal to or less than 60% by mass, sufficient battery capacity and battery conductivity are obtained.

The layer formed on the current collector by using the wet method or dry method is preferably pressurized to be dense with a hand press, a roller press or others in order to enhance a filling density of the positive electrode active material.

The range of the density of the positive electrode mixture that has been pressurized to be dense as described above is preferably from 2.5 to 2.8 g/cm$^3$, more preferably from 2.55 to 2.75 g/cm$^3$, and still more preferably from 2.6 to 2.7 g/cm$^3$ from the viewpoint of further improving the input/output characteristics and safety.

The range of the application amount of the positive electrode mixture to one side of the positive electrode current collector is preferably from 110 to 170 g/m$^2$, more preferably from 120 to 160 g/m$^2$, and still more preferably from 130 g/m$^2$ to 150 g/m$^2$ from the viewpoint of further improving the energy density and input/output characteristics.

In consideration of the application amount of the positive electrode mixture to one side of the positive electrode current collector and consideration of the positive electrode mixture density as described above, a thickness ([the thickness of the positive electrode−the thickness of the positive electrode current collector]/2) of the one-sided application film of the positive electrode mixture to the positive electrode current collector is preferably 39 to 68 μm, more preferably 43 to 64 μm, and still more preferably 46 to 60 μm.

While the material of the current collector for the positive electrode is not particularly limited, a metal material, especially aluminum, is particularly preferred.

The shape of the current collector is not particularly limited, and any material formed into various shapes can be used. As the metal material, a metal foil, a metal plate, a metal thin film, an expanded metal and others are cited. Among them, the metal thin film is preferably used. Note that the thin film may be formed into a mesh shape as appropriate.

While the thickness of the thin film is optional, the thickness is preferably 1 μm to 1 mm, more preferably 3 to 100 μm, and still more preferably 5 to 100 μm from the viewpoint of obtaining a required strength and a favorable flexibility for the current collector.

2. <Negative Electrode>

The present embodiment includes the following negative electrode that is applicable to a lithium ion battery having a high safety and high input/output power and long life. The negative electrode (negative electrode plate) of the present embodiment is made of a current collector and a negative electrode mixture formed on both surfaces of the current collector. While the formation method of the negative electrode mixture is not particularly limited, the negative electrode mixture is formed by using the dry or wet method as similar to the positive electrode mixture. The negative electrode mixture contains a negative electrode active material which can electrochemically capture and release lithium ions.

As the negative electrode active material, easily graphitizable carbon is used. The easily graphitizable carbon has an easily graphitizable property that causes graphitization by heat treatment at 800° C. or more. On the other hand, hardly graphitizable carbon has a hardly graphitizable property that is difficult to cause graphitization even by heat treatment at 2800° C. or more. This is because the easily graphitizable carbon has an atomic arrangement structure by which a layered structure is easily formed and has a property that easily changes this material state to a graphite structure by relatively lower-temperature heat treatment than that of the hardly graphitizable carbon.

The weight of the easily graphitizable carbon obtained at 550° C. in air flow by thermogravimetry (TG) is equal to or more than 75% of the weight of the same at 25° C. The weight of the same at 650° C. is equal to or less than 20% of the weight of the same at 25° C.

From the viewpoint of the battery performances, it is preferred that the weight of the same at 550° C. in air flow is equal to or more than 85% of the weight of the same at 25° C., and besides, that the weight of the same at 650° C. in air flow is equal to or less than 10% of the weight of the same at 25° C. Further, it is preferred that the weight of the same at 550° C. in air flow is equal to or more than 95% of the weight of the same at 25° C., and besides, that the weight of the same at 650° C. is less than 5% of the weight of the same at 25° C.

When the weight of the same at 550° C. in air flow is less than 75% of the weight of the same at 25° C., the input/output characteristics are reduced. When the weight of the same at 650° C. exceeds 20% of the weight of the same at 25° C., the cycle life characteristics are reduced. As the thermogravimetry apparatus in this process, the measurement can be made by using a TG analyzer (e.g., TG/DTA6200 produced by SII Nanotechnology Inc.). As the measurement conditions, the measurement can be made by sampling a 10 mg specimen and increasing a temperature with the temperature rising rate of 1° C./min under dry air circulation of 300 ml/min while taking alumina as a reference.

Specifically, the easily graphitizable carbon can be obtained by, for example, calcining a material having the graphitizable property in an inert atmosphere at 800° C. or more, and then, grinding this material by a known method such as jet mill, vibration mill, pin mill or hammer mill to adjust the median particle diameter to 5 to 30 μm.

While the material having the graphitizable property is not particularly limited, for example, a thermoplastic resin, naphthalene, anthracene, phenanthrene, coal tar, tar pitch and others are cited. Preferably, coal-based coal tar or petroleum-based tar is used.

In the hardly graphitizable carbon, it is defined here that a value of the interplanar spacing d002 in a C axis direction obtained by a wide-angle X-ray diffraction method is equal to or more than 0.36 nm and equal to or less than 0.40 nm.

In the easily graphitizable carbon, the value of the interplanar spacing d002 in the C axis direction obtained by the wide-angle X-ray diffraction method is preferably equal to or more than 0.34 nm and less than 0.36 nm, more preferably equal to or more than 0.341 nm and equal to or less than 0.355 nm, and still more preferably equal to or more than 0.342 nm and equal to or less than 0.35 nm.

The easily graphitizable carbon can be directly used as the negative electrode active material for the lithium ion battery. However, it is expected that the specific surface area is large depending on the grinding conditions, and therefore, desired characteristics may not be exerted. Accordingly, the physical property is preferably adjusted to the following physical properties (1) to (5) by forming a carbon layer or others on the surface of the easily graphitizable carbon.

(1) The range of the median particle diameter (d50) is as follows. The range is preferably from 5 μm to 30 μm, more preferably from 10 μm to 25 μm, and still more preferably from 12 μm to 23 μm.

When the median particle diameter is equal to or less than the upper limit, there are a tendency of difficulty in occurrence of surface irregularity on the electrode surface, which suppresses the short circuit of the battery, and besides, a tendency of improvement in the input/output characteristics of the lithium ion battery because the diffusion length of Li from the particle surface to the inside thereof is relatively short.

When the median particle diameter is equal to or more than the lower limit, the range of the specific surface area can be appropriate, and therefore, there are a tendency of the excellent initial charge/discharge efficiency of the lithium ion battery and a tendency of the excellent input/output characteristics because the particles have a good contact with each other.

The particle size distribution can be measured by dispersing a specimen into purified water containing a surfactant and using a laser diffraction particle size distribution measurement apparatus (SALD-3000J, produced by Shimadzu Corporation), and the average particle diameter is calculated as "50% D".

(2) The range of the BET specific surface area (measurement temperature: 77 K) as obtained by a nitrogen adsorption method is as follows. The range is preferably from 1.0 $m^2/g$ to 5.0 $m^2/g$, more preferably from 1.3 $m^2/g$ to 4.0 $m^2/g$, and still more preferably from 1.5 m²/g to 3.0 m²/g. When the BET specific surface area is equal to or more than the lower limit, the input/output characteristics are excellent. When the BET specific surface area is equal to or less than the upper limit, a loss of the initial battery capacity is small, which results in excellent cycle life characteristics.

Note that the specific surface area in nitrogen adsorption can be obtained from the adsorption isotherm obtained by the nitrogen adsorption measurement at 77 K using the BET method.

(3) The range of the carbon dioxide adsorption amount (measurement temperature: 273 K) until a relative pressure of 0.03 is as follows. The range is preferably from 0.01 cm³/g to 4.0 cm³/g, more preferably from 0.05 cm³/g to 1.5 cm³/g, and still more preferably from 0.1 cm³/g to 1.2 cm³/g.

Note that the specific surface area in carbon dioxide adsorption can be obtained from the adsorption isotherm obtained by the carbon dioxide adsorption measurement at 273 K using the BET method.

When the specific surface area is equal to or more than the lower limit, the input characteristics are excellent. When the specific surface area is equal to or less than the upper limit, a loss of initial irreversible capacity is small, and the cycle life characteristics are excellent.

Therefore, the easily graphitizable carbon in the present invention may be obtained by forming a carbon layer on a surface of an easily graphitizable carbon to be a nucleus whose weight at 550° C. in air flow as obtained by thermogravimetry (TG) is equal to or more than 75% of the weight at 25° C. and whose weight at 650° C. is equal to or less than 20% of the weight at 25° C.

The above-described carbon layer can be formed by, for example, adhering an organic compound (carbon precursor) in which a carbonaceous has been left by a heat treatment onto the surface of the easily graphitizable carbon, and then, calcining it. While the method of adhering the organic compound onto the surface of the easily graphitizable carbon is not particularly limited, for example, a wet method, a dry method, a gas phase method such as a CVD method and others may be cited, the wet method dispersing or mixing an easily graphitizable carbon to be a nucleus in a mixed solution obtained by dissolving or dispersing an organic compound in a solvent, and then, removing the solvent, the dry method mixing a solid easily graphitizable carbon and a solid organic compound, and then, applying a mechanical energy to the mixture to adhere each other. Among them, the wet method is preferable from the viewpoints of uniformity, easy control of the reaction system, and capable of maintaining the shape of the easily graphitizable carbon.

The organic compound is not particularly limited so that a polymer compound such as a thermoplastic resin or a thermosetting resin can be used. However, the thermoplastic polymer compound is preferable because, when the surface of the easily graphitizable carbon is coated with the thermoplastic polymer compound, the specific surface area of the negative electrode active material itself becomes small since the thermoplastic polymer compound is carbonized after being in a liquid phase so as to generate carbon having a small specific surface area, which results in the small initial irreversible capacity of the lithium ion battery. While the thermoplastic polymer compound is not particularly limited, for example, ethylene heavy end pitch, petroleum pitch, coal tar pitch, asphalt degradation pitch, pitch obtained by pyrolyzing polyvinyl chloride or others, and synthetic (resultant) pitch manufactured by polymerizing naphthalene or others under the presence of super-acid can be used. Alternatively, thermoplastic synthetic resins such as polyvinyl chloride, polyvinyl alcohol, polyvinyl acetate, and polyvinyl butyral or natural products such as starch and cellulose can be also used. One type of these organic compounds or a combination of two or more types of the same may be used.

Further, the solvent for dissolving and dispersing the organic compounds is not particularly limited. However, when the organic compound is a pitch-based material, for example, tetrahydrofuran, toluene, xylene, benzene, quinoline, or others can be used. Additionally, an appropriate solvent may be used depending on the type of the organic compound.

The solvent can be removed by the heating at normal pressures or reduced-pressure atmosphere. When the atmosphere is air, the temperature in the removal of the solvent is preferably equal to or less than 200° C. When the removal temperature exceeds 200° C., desired characteristics cannot be exerted in some cases because the oxygen in the atmosphere reacts with the organic compound and the solvent (particularly when creosote oil is used), so that the amount of the carbon formed by calcination is varied or the porous structure is caused, and the characteristics are out of the range of the physical properties of the present invention required for the negative electrode active material.

While the calcination conditions for the carbon coating may be appropriately determined while taking into consideration a carbonization rate of the organic compound and is not particularly limited, the temperature range is preferably from 700 to 1400° C., more preferably from 800 to 1300° C. under a non-oxidizing atmosphere. When the calcination temperature is less than 700° C., the case of usage of the coated substance as the negative electrode active material has a tendency of the large initial irreversible capacity of the lithium ion battery. On the other hand, even by the heating at a temperature exceeding 1400° C., the performance is hardly changed, and this manner causes only increase in a cost. As the non-oxidizing atmosphere, for example, an inert gas atmosphere such as nitrogen, argon or helium, and a vacuum atmosphere, and others are cited.

Note that the calcination time is appropriately selected depending on the type of the organic compound to be used and the adhering amount, and is not particularly limited. The calcination apparatus to be used is not particularly limited, either, as long as it is a reactor having a heating mechanism, and calcination apparatuses that can perform processes by the continuous method, the batch method or others can be cited.

Here, in the easily graphitizable carbon obtained by calcination process, the individual particles aggregate in some cases, and therefore, the crushing process is preferably performed. When such adjustment as providing a desired median particle diameter is required, the grinding process may be further performed.

The thermogravimetry (TG) result of the easily graphitizable carbon (after being coated) having the carbon layer formed thereon by the above-described method is different from the thermogravimetry result of the easily graphitizable carbon (before being coated) to be the nucleus in some cases, due to an influence of the formed carbon layer (the crystallinity, the coating amount, etc.). In order to obtain the desired characteristics, even in the thermogravimetry result of the easily graphitizable carbon (after being coated) having the carbon layer formed thereon, it is preferred that the weight at 550° C. in air flow is equal to or more than 75% of the weight at 25° C., and that the weight at 650° C. is equal to or less than 20% of the weight at 25° C.

In addition, the crystallinity of the surface carbon layer is preferably lower than that of the easily graphitizable carbon to be the nucleus. The lyophilic property between the negative electrode active material for the lithium ion battery and the electrolyte solution is improved by decreasing the crystallinity of the surface carbon layer to be lower than that of the easily graphitizable carbon to be the nucleus. As a result, there is a tendency of improvement in the cycle life characteristics. When such an easily graphitizable carbon is used as the negative electrode active material, the safety, the input/output characteristic, and the cycle life characteristics are excellent.

Therefore, the easily graphitizable carbon in the present invention may include the easily graphitizable carbon to be the nucleus and the carbon layer formed on the surface of the easily graphitizable carbon. While the method of forming the carbon layer described here is not particularly limited, desired physical properties can be controlled by appropriately selecting various calcination conditions (the type of the organic compound, the coating amount, the calcination temperature, etc.). As a result, the desired characteristics can be exerted.

Further, as the negative electrode active material, mixture with a carbonaceous material with high conductivity such as graphite or activated carbon may be used.

In the case of the mixture, a mixture rate (mass ratio) of the graphite material is preferably from "easily graphitizable carbon/graphite"=100/0 to 10/90, more preferably from 100/0 to 50/50, and still more preferably from 100/0 to 80/20. The graphite with such conditions is used as the negative electrode active material, so that the battery performance can be improved as high energy density and high output. Further, the easily graphitizable carbon may be used in combination with the hardly graphitizable carbon. A mixture rate (mass ratio) of the hardly graphitizable carbon is preferably from "easily graphitizable carbon/hardly graphitizable carbon"=100/0 to 10/90, more preferably from 100/0 to 50/50, and still more preferably from 100/0 to 70/30.

Further, a carbonaceous material having different properties from those of the easily graphitizable carbon may be added as the conductive material. The above-described properties represent one or more characteristics including an X-ray diffraction parameter, a median particle diameter, an aspect ratio, a BET specific surface area, an orientation ratio, a Raman R value, a tap density, a true density, a pore distribution, a circularity, and an ash content.

As the conductive material, graphite such as natural graphite and artificial graphite, carbon black such as acetylene black, amorphous carbon such as needle coke, or others can be used. One type of them or a combination of two or more types of them may be used. By the addition of the conductive material as described, the effect such as the reduction in the resistance of the electrode is exerted.

The range of the contained amount of the conductive material relative to a weight of the negative electrode mixture is preferably from 1 to 45% by weight, more preferably from 2 to 42% by weight, and still more preferably from 3 to 40% by weight, from the viewpoint of improving the conductivity and reducing the initial irreversible capacity.

While a material and a shape of the current collector for the negative electrode are not particularly limited, a copper foil is preferred from the viewpoint of easy processing and cost. The copper foil includes a rolled copper foil formed by a rolling method and an electrolytic copper foil formed by an electrolytic method, and either of the foils is suitably used as the current collector.

The thickness of the current collector is not limited. However, when the thickness is less than 25 μm, the strength of the current collector can be enhanced by using a copper alloy that is stronger than pure copper.

The application amount of the negative electrode material to one side of the current collector is preferably from 50 to 120 $g/m^2$, and more preferably from 60 to 100 $g/m^2$ from the viewpoint of improving the energy density and the input/output characteristics. While the configuration of the negative electrode mixture formed by using the negative electrode active material is not particularly limited, the range of the density of the negative electrode mixture is preferably from 0.7 to 2 $g/cm^3$, more preferably from 0.8 to 1.9 $g/cm^3$, and still more preferably from 0.9 to 1.8 $g/cm^3$.

When the range is equal to or more than 0.7 $g/cm^3$, the conductivity between the negative electrode active materials can be enhanced to suppress the increase in the battery resistance, and the capacity per unit volume can be improved. When the range is equal to or less than 2 $g/cm^3$, there is less risk of deterioration of the discharge characteristics due to the increase in the initial irreversible capacity and the decrease in the permeability of the electrolyte solution to vicinity of the interface between the current collector and the negative electrode active material.

The binder of the negative electrode active material is not particularly limited as long as it is a material that is stable to a non-aqueous electrolyte solution or the dispersion solvent used in the formation of the electrode, and the same binder as that used as the binder of the positive electrode active material can be used. One type of the binders or a combination of two or more types of the binders may be used.

The type of the dispersion solvent for forming a slurry is not limited as long as the solvent can dissolve or disperse the negative electrode active material, the binder, the conductive material and the thickener which are used if necessary, and others, and either of the aqueous solvent and the organic solvent may be used. As examples of the aqueous solvent, water, a mixed solvent of alcohol and water, and others are cited. As examples of the organic solvent, N-methylpyrrolidone (NMP), cyclohexanone, methyl acetate, and others are cited. Particularly when the aqueous solvent is used, it is preferred to use a thickener. A dispersion material or others is added together with this thickener, and latex such as SBR is used to form a slurry. Note that one type of the dispersion solvents or combination of two or more types of the dispersion solvents may be used.

The range of the contained amount of the binder relative to the mass of the negative electrode mixture is preferably from 0.1 to 20% by mass, more preferably from 0.5 to 15% by mass, and still more preferably from 0.6 to 10% by mass.

When the contained amount of the binder is equal to or more than 0.1% by mass, the negative electrode active material can be sufficiently bound, and therefore, a sufficient mechanical strength of the negative electrode active material can be obtained. When the contained amount is equal to or less than 20% by mass, sufficient battery capacity and conductivity can be obtained.

In particular, the range of the contained amount of the binder relative to a weight of the negative electrode mixture obtained when the rubber-form polymer represented by SBR is used as a main component of the binder is as follows. The range is preferably from 0.1 to 5% by mass, more preferably from 0.5 to 3% by mass, and still more preferably from 0.6 to 2% by mass.

The range of the contained amount of the binder relative to a weight of the negative electrode mixture obtained when the fluorine-based polymer represented by polyvinylidene fluoride is used as a main component of the binder is preferably from 1 to 15% by mass, more preferably from 2 to 10% by mass, and still more preferably from 3 to 8% by mass.

The thickener is used to adjust a viscosity of the slurry. While the thickener is not particularly limited, carboxymethyl cellulose, methyl cellulose, and other are cited. One type of them or a combination of two or more types of them may be used.

When the thickener is used, the range of the contained amount of the thickener relative to a weight of the negative electrode mixture is preferably from 0.1 to 5% by mass, more preferably from 0.5 to 3% by mass, and still more preferably from 0.6 to 2% by mass.

3. <Electrolyte Solution>

The electrolyte solution of the present embodiment is composed of lithium salt (electrolyte) and a non-aqueous solvent which dissolves the lithium salt. If necessary, an additive may be added.

While the lithium salt is not particularly limited as long as it can be used as an electrolyte of the electrolyte solution for the lithium ion battery, inorganic lithium salt, fluorine-containing organic lithium salt, oxalatoborate salt, which are described below, and others are cited.

As the inorganic lithium salt, inorganic fluoride salts such as $LiPF_6$, $LiBF_4$, $LiAsF_6$, and $LiSbF_6$, perhalogen acid salts such as $LiClO_4$, $LiBrO_4$, and $LiIO_4$, inorganic chloride salts such as $LiAlCl_4$ and others are cited. The fluorine-containing organic lithium salt, fluoroalkyl fluorophosphate, and others may be used. As the oxalatoborate salt, lithium bis(oxalato) borate, lithium difluoro oxalatoborate, and others are cited.

One type of these lithium salts or a combination of two or more types of the lithium salts may be used. Among them, lithium hexafluorophosphate ($LiPF_6$) is preferred in comprehensive consideration of solubility for solvent, charge/discharge characteristics in a case of usage as the battery, output characteristics, cycle characteristics, and others.

While the concentration of the electrolyte in the electrolyte solution is not particularly limited, the range of the concentration of the electrolyte is preferably from 0.5 mol/L to 2 mol/L, more preferably from 0.6 mol/L to 1.8 mol/L, and still more preferably from 0.7 mol/L to 1.8 mol/L.

When the concentration is equal to or more than 0.5 mol/L, a sufficient electric conductivity of the electrolyte solution is obtained. Further, when the concentration is equal to or less than 2 mol/L, the decrease in electric conductivity can be suppressed because the viscosity is not too high.

While the non-aqueous solvent is not particularly limited as long as it is a non-aqueous solvent which can be used as the solvent of the electrolyte for the lithium ion battery, the following cyclic carbonate, chain carbonate, chain ester, cyclic ether, chain ether, and others are cited.

For example, ethylene carbonate, propylene carbonate, butylene carbonate, dialkyl carbonate, dimethyl carbonate, diethyl carbonate, di-n-propyl carbonate, ethylmethyl carbonate, methyl-n-propyl carbonate, ethyl-n-propyl carbonate, methyl acetate, tetrahydrofuran, dimethoxyethane, dimethoxymethane, and others are cited.

One type of these solvents or combination of two or more types of the solvents may be used. However, it is preferred to use a mixed solvent in combination of two or more types of compounds, and it is preferred to use combination of a high-permittivity solvent such as cyclic carbonates and a low viscosity solvent such as chain carbonates or chain esters. One of the preferred combinations is the combination mainly including the cyclic carbonates and the chain carbonates as main constituents. Among them, a total of the cyclic carbonates and the chain carbonates which occupies the non-aqueous solvent is preferably equal to or more than 80% by volume, more preferably 85% by volume, and still more preferably 90% by volume. Besides, the volume of the cyclic carbonates relative to the total of the cyclic carbonates and the chain carbonates is preferably in the following range.

The volume of the cyclic carbonates is preferably from 5 to 50% by volume, more preferably from 10 to 35% by volume, and still more preferably from 15 to 30% by volume. By using such a combination of the non-aqueous solvents, cycle characteristics and high temperature storage characteristics (in particular, a remaining capacity and a high-load discharge capacity after storage at a high temperature) of the battery are improved.

While the additive is not particularly limited as long as it is the additive for the electrolyte solution of the lithium ion battery, for example, a heterocyclic compound containing sulfur or nitrogen, cyclic carboxylate ester, fluorine-containing cyclic carbonate, and other compounds each having an unsaturated bond within a molecule are cited. From the viewpoint of the extension of the battery life, the fluorine-containing cyclic carbonate or other compounds each having an unsaturated bond within a molecule is preferred.

In addition to the additives, other additives such as an overcharge prevention material, a negative-electrode coating material, a positive-electrode protection material, a high input/output material, may be used in accordance with desired functions.

By the above-described other additives, for example, rapid electrode reaction in an abnormal state due to overcharge can be suppressed, the capacity retention characteristics and the cycle characteristics after the storage at the high temperature can be improved, and the input/output characteristics can be improved.

4. <Separator>

The separator is not particularly limited as long as it has ionic permeability while electronically insulating the positive electrode and the negative electrode and is provided with a resistance against oxidation nature on the positive electrode side and reduction nature on the negative electrode side. As a material (substance) for the separator which satisfy such characteristics, for example, resin, inorganic substance, glass fiber or others is used.

As the resin, olefin-based polymer, fluorine-based polymer, cellulose-based polymer, polyimide, nylon, or others is used. It is preferred to select from materials which are stable for the electrolyte solution and excellent in liquid retention, and it is preferred to use a porous sheet, non-woven fabric, or others using polyolefin such as polyethylene or polypropylene as a raw material.

As the inorganic substance, oxides such as alumina and silicon dioxide, nitrides such as aluminum nitride and silicon nitride, sulfates such as barium sulfate, or others is used. For example, a material obtained by adhering the above-described inorganic substance with a fiber shape or a particle shape onto a base material with a thin film shape such as a non-woven fabric, a woven fabric, a fine porous film, or others can be used as the separator. As the base material with the thin film shape, a material whose pore diameter is from 0.01 to 1 μm and thickness is from 5 to 50 μm is preferably used.

5. <Other Component Members>

A cleavage valve may be provided as one of other component members of the lithium ion battery. By opening the cleavage valve, pressure increase inside the battery can be suppressed, so that safety can be improved.

Also, a component unit which releases an inert gas (e.g., carbon dioxide) in accordance with temperature increase may be provided. By providing such a component unit, the cleavage valve can be promptly opened when the inert gas is caused in the temperature increase inside the battery, so that the safety can be improved. As a material used for the component unit, lithium carbonate, polyethylene carbonate, or polypropylene carbonate is preferred.

(Discharge Capacity of Lithium Ion Battery)

The discharge capacity of the lithium ion battery of the present invention is equal to or more than 30 Ah and less than 99 Ah. However, the discharge capacity is preferably equal to or more than 30 Ah and less than 99 Ah, and more preferably equal to or more than 55 Ah and less than 95 Ah from the viewpoint of achieving the high input/output characteristics and the high energy density while guaranteeing the safety.

(Capacity Ratio Between Negative Electrode and Positive Electrode of Lithium Ion Battery)

In the present invention, the capacity ratio between the negative electrode and the positive electrode (negative electrode capacity/positive electrode capacity) is preferably equal to or more than 1 and less than 1.3, more preferably from 1.05 to 1.25, and still more preferably from 1.1 to 1.2 from the viewpoint of the safety and the energy density. When the capacity ratio is equal to or more than 1.3, a positive electrode potential may be higher than 4.2 Vat the time of charging, and thus, there is a possibility of reduction in the safety (the positive electrode potential in this case refers to "vs. Li potential").

Here, the negative electrode capacity represents [the discharge capacity of the negative electrode], and the positive electrode capacity represents [the initial charge capacity of the positive electrode–either larger one of irreversible capacities of the negative electrode and the positive electrode]. Here, [the discharge capacity of the negative electrode] is defined as the capacity calculated by a charge/discharge device when lithium ions inserted in the negative electrode active material are desorbed. Also, [the initial charge capacity of the positive electrode] is defined as the capacity calculated by the charge/discharge device when lithium ions are desorbed from the positive electrode active material.

The capacity ratio between the negative electrode and the positive electrode can be also calculated from, for example, "the discharge capacity of the lithium ion battery/the discharge capacity of the negative electrode". The discharge capacity of the lithium ion battery can be measured under the conditions of, for example, constant-current (CC) discharge to 2.7 V at 0.1 to 0.5 C after constant-current constant-voltage (CCCV) charge at 4.2 V and 0.1 to 0.5 C for a termination time of 2 to 5 hours. The discharge capacity of the negative electrode can be calculated by cutting the negative electrode whose discharge capacity has been measured in the lithium ion battery to a predetermined area, manufacturing a mono-polar cell using lithium metal as a counter electrode through a separator impregnated with an electrolyte solution, measuring a discharge capacity per the predetermined area under the conditions of constant-current (CC) discharge to 1.5 V at 0.1 C after constant-current constant-voltage (CCCV) charge at 0 V and 0.1 C with a termination current of 0.01 C, and converting the measurement result in terms of a total area used as the negative electrode of the lithium ion battery. The mono-polar cell is defined so that a direction where the lithium ions are inserted into the negative electrode active material is the charge, and a direction where the lithium ions inserted in the negative electrode active material are desorbed is the discharge. Note that "C" means "current value (A)/discharge capacity (Ah) of battery".

Examples

[Manufacture of Positive Electrode Plate]

A positive electrode plate was manufactured as follows. As the positive electrode active material, a lithium-nickel-manganese-cobalt composite oxide (NMC) having a layered crystal structure (BET specific surface area: 0.4 $m^2/g$, median particle diameter (d50): 6.5 μm) was used. The positive electrode mixture was been obtained by sequentially adding and mixing, to the positive electrode active material, a flake graphite (average particle diameter: 20 μm) and acetylene black (product name: HS-100, average particle diameter: 48 nm (that is a value on a catalog of DENKI KAGAKU KOGYO Corporation) produced by DENKI KAGAKU KOGYO Corporation) serving as the conductive material, and polyvinylidene fluoride serving as the binder. The mass ratio was set as "the active material:the conductive material:the binder=90:5:5". Furthermore, N-methyl-2-pyrrolidone (NMP) as a dispersion solvent was added to the mixture and kneaded, so that a slurry was formed. This slurry was applied substantially evenly and uniformly onto both surfaces of an aluminum foil having a thickness of 20 μm serving as the current collector for the positive electrode. Thereafter, a resultant material was subjected to a drying process to be consolidated by pressing until the material has a predetermined density. The density of the positive electrode mixture was set to 2.8 $g/cm^3$, and the application amount of the positive electrode mixture to one surface was set to 140 $g/m^2$.

In the examples, note that a material expressed by a composition formula "$LiMn_{1/3}Ni_{1/3}Co_{1/3}O_2$" was used as the positive electrode active material.

[Manufacture of Negative Electrode Plate]

A negative electrode plate was manufactured as follows. As a negative electrode active material, a material of an easily graphitizable carbon having physical properties shown in Table 1 was used (examples 1 to 12, comparative examples 1 to 3).

Specifically, in the examples 1 to 3, polyvinyl alcohol was used as a carbon precursor, and a negative electrode active material obtained by coating the surface of the easily graphitizable carbon with 2 to 6% of carbon was used. In the examples 4 to 12, pitch was used as the carbon precursor, and a negative electrode active material obtained by coating the surface of the easily graphitizable carbon with 1 to 8% of carbon was used.

In the comparative examples 1 to 3, polyvinyl alcohol was used as the carbon precursor, and a negative electrode active material obtained by coating the surface of the easily graphitizable carbon with 10 to 12% of carbon was used.

The hardly graphitizable carbon used in the comparative example 4 had physical properties such as the median particle diameter (d50): of 10 μm, the specific surface area of 5.1 $m^2/g$, the carbon dioxide adsorption amount of 4.1 $cm^3/g$, and the R value (IG/ID) of 0.96.

As the graphite used in the comparative example 5, an artificial graphite having physical properties such as the median particle diameter (d50) of 22 μm, the specific surface area of 2.3 m²/g, the carbon dioxide adsorption amount of 0.36 cm³/g, the R value (IG/ID) of 1.85.

As the binder, polyvinylidene fluoride was added to these negative electrode active materials. The weight ratio was set so that "active material:binder=92:8". N-methyl-2-pyrrolidone (NMP) as the dispersion solvent was added to the above-described mixture and kneaded, so that a slurry was formed. A predetermined amount of this slurry was applied substantially evenly and uniformly onto both surfaces of a rolled copper foil having a thickness of 10 μm serving as the current collector for the negative electrode. The density of the negative electrode mixture of each of the examples 1 to 12 and the comparative examples 1 to 3 was set to 1.15 g/cm³. The densities of the negative electrode materials of the comparative example 4 and 5 were set to 1.15 g/cm³ and 1.40 g/cm³, respectively.

[Manufacture of Battery]

The positive electrode plate and the negative electrode plate were wound while sandwiching a separator made of polyethylene having a thickness of 30 μm therebetween so as not to be in direct contact with each other. At this time, a lead piece of the positive electrode plate and a lead piece of the negative electrode plate were configured to be positioned on both end surfaces that are opposite to each other in the wound group. In addition, the lengths of the positive electrode plate, the negative electrode plate, and the separator were adjusted so that a diameter of the wound group is 65±0.1 mm.

Subsequently, as shown in FIG. 1, the lead pieces 9 led out from the positive electrode plate were deformed so that all of them are gathered and made to be in contact with each other in the vicinity of a bottom part of a flange 7 on the side of the positive electrode. The flange 7 on the side of the positive electrode was integrally formed so as to protrude from circumference of an electrode pole (positive electrode external terminal 1) located approximately on an extension line of an axis core of the wound group 6, and had a bottom part and a side part. After that, the lead piece 9 was connected and fixed to the bottom part of the flange 7 by ultrasonic welding. The lead pieces 9 led out from the negative electrode plate and the bottom part of the flange 7 on the side of the negative electrode were similarly connected and fixed. The flange 7 on the side of the negative electrode was integrally formed so as to protrude from circumference of an electrode pole (negative electrode external terminal 1') located approximately on an extension line of an axis core of the wound group 6, and had a bottom part and a side part.

Thereafter, the side part of the flange 7 on the side of the positive electrode external terminal 1 and the side part of the flange 7 on the side of the negative electrode external terminal 1' were covered by using an adhesive tape, so that an insulating coating part 8 was formed. Similarly, the insulating coating part 8 was formed also on the outer circumference of the wound group 6. For example, the insulating coating part 8 was formed by winding this adhesive tape over and over again from the side part of the flange 7 on the side of the positive electrode external terminal 1 to the outer circumferential surface of the wound group 6 and from the outer circumferential surface of the wound group 6 to the side part of the flange 7 on the side of the negative electrode external terminal 1'.

As the insulating coating part (adhesive tape) 8, an adhesive tape whose base material was polyimide and whose one side was coated with a methacrylate-based adhesive material was used. The thickness of the insulating coating part 8 (the number of winding turns of the adhesive tape) was adjusted so that the maximum diameter part of the wound group 6 is slightly smaller than an inner diameter of a battery container 5 made of stainless steel, and the wound group 6 was inserted into the battery container 5. As for the battery container 5, note that the container whose outer diameter was 67 mm and whose inner diameter was 66 mm was used.

Subsequently, as shown in FIG. 1, a ceramic washer 3' was fitted to each of an electrode pole whose tip constitutes the positive electrode external terminal 1 and an electrode pole whose tip constitutes the negative electrode external terminal 1'. The ceramic washer 3' is made of alumina, and has a part abutting on a back surface of a battery cap 4, the part having a thickness of 2 mm, an inner diameter of 16 mm, and an outer diameter of 25 mm. Subsequently, the positive electrode external terminal 1 was inserted through the ceramic washer 3 while the ceramic washer 3 was placed on the battery cap 4, and the negative electrode external terminal 1' was inserted through a different ceramic washer 3 while a different ceramic washer 3 was placed on a different battery cap 4. The ceramic washer 3 was made of alumina and had a flat plate shape with a thickness of 2 mm, an inner diameter of 16 mm, and an outer diameter of 28 mm.

Thereafter, a peripheral end surface of the battery cap 4 was fitted to an opening of the battery container 5, and the whole region of a contact portion between the battery cap and the battery container was laser-welded. At this time, each of the positive electrode external terminal 1 and the negative electrode external terminal 1' penetrated through a hole (opening) located at the center of the battery cap 4, and protruded to the outside of the battery cap 4. In the battery cap 4, a cleavage valve 10 cleaving in accordance with increase in an internal pressure of the battery was provided. Note that the cleaving pressure of the cleavage valve 10 was set to 13 to 18 kgf/cm² (1.27 to 1.77 MPa).

Subsequently, as shown in FIG. 1, a metal washer 11 was fitted to each of the positive electrode external terminal 1 and the negative electrode external terminal 1'. In this manner, the metal washer 11 was disposed on the ceramic washer 3. The metal washer 11 was made of a material smoother than a bottom surface of a nut 2.

Subsequently, the metal nut 2 was screwed into each of the positive electrode external terminal 1 and the negative electrode external terminal 1', and the battery cap 4 was fastened tightly and fixed between the flange 7 and the nut 2 via the ceramic washer 3, the metal washer 11, and the ceramic washer 3'. At this time, a fastening torque value was set to 70 kgf·cm (6.86 N·m). Note that the metal washer 11 did not rotate until fastening work was completed. In this state, a power generation element inside the battery container 5 was isolated from the outside air by compression of an O-ring 12 made of rubber (EPDM) interposed between the back surface of the battery cap 4 and the flange 7.

Thereafter, a predetermined amount of the electrolyte solution was injected from an injection port 13 provided in the battery cap 4 into the battery container 5, and then, the injection port 13 was sealed, so that a cylindrical lithium ion battery 20 was completed.

As the electrolyte solution, a solution was used, the solution being obtained by dissolving lithium hexafluorophosphate ($LiPF_6$) of 1.2 mol/L into a mixed solution in which ethylene carbonate, dimethyl carbonate, and ethylmethyl carbonate were mixed with a volume ratio of "2:3:2", and by adding vinylene carbonate (VC) of 0.8% by mass as an additive.

[Evaluation of Battery Characteristics (Discharge Capacity, Input/Output Characteristics, and Cycle Life Characteristics)]

(Discharge Capacity)

Under an environment of 25° C., measurement was performed by using a constant-current constant-voltage (CCCV) charge method (hereinafter, referred to as "CCCV charge"). The CCCV charge is a method of charging at a predetermined current value (constant current) and continuing the charge for a predetermined time by switch to a constant voltage at time at which a voltage reaches the predetermined voltage value.

Specifically, the charge was started at a current value of 0.5 CA, and the charge was continued for 3 hours from a moment when the voltage reached 4.2 V so as to keep the voltage of 4.2 V, and then, terminated. The process paused for 30 minutes after the charge, and then, then, the constant-current discharge of 0.5 C was performed, and terminated at time at which the voltage reached 2.7 V.

Three cycles of this process were performed, and it was set that the charge capacity at the third cycle is a "charge capacity at a current value of 0.5 CA", and set that the discharge capacity at the third cycle was a "discharge capacity at a current value of 0.5 CA".

(Output Characteristics)

For the output characteristics, the CCCV charge method was similarly used. After the measurement of the discharge capacity at the third cycle described above, the charge was started at a current value of 0.5 CA, and the charge was continued for 3 hours from a moment when the voltage reached 4.2 V so as to keep the voltage, and then, terminated. Then, the discharge was performed at a current value of 3 CA, and the discharge was terminated at a moment when the voltage reached 2.7 V. It was set that the discharge capacity at this moment is a "discharge capacity at a current value of 3 C", and the output characteristics were calculated based on the following formula. Thereafter, the constant-current discharge with a termination voltage of 2.7 V at a current value of 0.5 CA was performed.

Output Characteristics (%)=("Discharge Capacity at Current Value of 3 CA"/"Discharge Capacity at Current Value of 0.5 CA")×100

(Input Characteristics)

As for the input characteristics, after the measurement of the output characteristics, the charge was performed at a current value of 3 CA by using the CCCV charge method, and the charge was continued for 3 hours from a moment when the voltage reached 4.2 V so as to keep 4.2 V, and then, terminated. It was set that the charge capacity at this moment is a "charge capacity at a current value of 3 C", and the input characteristics were calculated based on the following formula. Thereafter, the constant-current discharge with a termination voltage of 2.7 V at a current value of 0.5 CA was performed.

Input Characteristics (%)=("Charge Capacity at Current Value of 3 CA"/"Charge Capacity at Current Value of 0.5 CA")×100

(Cycle Life Characteristics)

In the battery cycle test, after the measurement of the discharge capacity at the third cycle, the following test was performed. The charge was performed at a current value of 1 CA in a thermostat bath at 25° C. based on the CCCV charge method, and the charge was continued for 3 hours from a moment when the voltage reached 4.2 V so as to keep 4.2 V, and then, terminated. As for the discharge conditions, the discharge at a current value of 1 CA with a voltage of 2.7 V was performed based on the CC discharge method.

Such charge/discharge cycle was set as one cycle, and the discharge capacity retention rate from the first cycle after repeating the cycle 300 times was calculated. Note that a pause for 15 minutes was provided between the charge and the discharge.

(Safety)

Safety was checked by a nail penetration test. First, the charge/discharge cycle at a current value of 0.5 C was repeated twice under an environment of 25° C. in a voltage range of 4.2 to 2.7 V. After the battery was further charged until the voltage reaches 4.2 V, a nail having a diameter of 5 mm was stabbed into the central part of the battery (cell) at a speed of 1.6 mm/sec, and the positive electrode and the negative electrode were short-circuited in the battery container. The external appearance change of the battery at this time was checked. Specifically, it was checked whether the battery container was broken or not. The breakage of the battery container includes crack, swelling, and ignition.

The evaluation was mage so that a result without the breakage of the battery container (except the nail-stabbed part) is "A" and so that a result with the breakage of the battery container is "B".

The results of the examples and comparative examples described above were shown in Tables 1 and 2.

TABLE 1

|  | Example 1 | Example 2 | Example 3 | Example 4 | Example 5 | Example 6 | Example 7 |
|---|---|---|---|---|---|---|---|
| Positive electrode active material | Layered type lithium-nickel-manganese-cobalt composite oxide | | | | | | |
| Negative electrode active material | Easily graphitizable carbon | | | | | | |
| Organic compound (Carbon precursor) | Polyvinyl alcohol | | | Pitch | | | |
| Coating amount[%] | 2 | 4 | 6 | 1 | 2 | 4 | 6 |
| Calcination temperature[° C.] | 900 | 900 | 900 | 900 | 900 | 900 | 900 |
| Weight ratio[%]   550° C. | 95 | 82 | 76 | 93 | 95 | 96 | 94 |
|                  650° C. | 5 | 9 | 3 | 6 | 5 | 3 | 4 |
| Particle diameter[μm] | 18 | 17 | 19 | 15 | 15 | 17 | 19 |
| Specific surface area[m$^2$/g] | 2.2 | 1.9 | 1.8 | 3.8 | 3.1 | 2.0 | 1.8 |
| $CO_2$ adsorption amount[cm$^3$/g] | 0.91 | 1.05 | 1.11 | 0.30 | 0.34 | 0.48 | 0.52 |
| Discharge capacity[Ah] | 57.9 | 57.5 | 57.2 | 58.0 | 57.9 | 58.4 | 58.2 |
| Output characteristics[%] | 94 | 93 | 91 | 90 | 91 | 92 | 90 |
| Input characteristics[%] | 85 | 84 | 81 | 85 | 86 | 87 | 83 |
| Cycle life characteristics[%] | 85 | 82 | 82 | 92 | 93 | 96 | 91 |
| Safety | A | A | A | A | A | A | A |

TABLE 1-continued

|  | Example 8 | Example 9 | Example 10 | Example 11 | Example 12 |
|---|---|---|---|---|---|
| Positive electrode active material | Layered type lithium-nickel-manganese-cobalt composite oxide | | | | |
| Negative electrode active material | Easily graphitizable carbon | | | | |
| Organic compound (Carbon precursor) | Pitch | | | | |
| Coating amount[%] | 8 | 2 | 4 | 6 | 8 |
| Calcination temperature[° C.] | 900 | 1000 | 1000 | 1000 | 1000 |
| Weight ratio[%]   550° C. | 91 | 96 | 97 | 96 | 95 |
| 650° C. | 6 | 5 | 3 | 3 | 3 |
| Particle diameter[μm] | 20 | 16 | 18 | 19 | 21 |
| Specific surface area[m$^2$/g] | 1.8 | 2.5 | 2.1 | 1.7 | 1.7 |
| $CO_2$ adsorption amount[cm$^3$/g] | 0.45 | 0.11 | 0.11 | 0.11 | 0.13 |
| Discharge capacity[Ah] | 58.3 | 58.0 | 58.3 | 58.7 | 58.6 |
| Output characteristics[%] | 91 | 94 | 93 | 93 | 94 |
| Input characteristics[%] | 86 | 86 | 87 | 85 | 88 |
| Cycle life characteristics[%] | 90 | 93 | 95 | 96 | 97 |
| Safety | A | A | A | A | A |

TABLE 2

|  | Comparative example 1 | Comparative example 2 | Comparative example 3 | Comparative example 4 | Comparative example 5 |
|---|---|---|---|---|---|
| Positive electrode active material | Layered type lithium-nickel-manganese-cobalt composite oxide | | | | |
| Negative electrode active material | Easily graphitizable carbon | | | Hardly graphitizable carbon | Graphite |
| Organic compound (Carbon precursor) | Polyvinyl alcohol | | | — | — |
| Coating amount[%] | 10 | 12 | 12 | — | — |
| Weight ratio[%]   550° C. | 66 | 67 | 74 | 2 | 100 |
| 650° C. | 17 | 22 | 23 | 1 | 93 |
| Particle diameter[μm] | 21.5 | 21.6 | 21.8 | 10 | 22 |
| Specific surface area[m$^2$/g] | 1.7 | 1.7 | 1.6 | 5.1 | 2.3 |
| $CO_2$ adsorption amount[cm$^3$/g] | 1.33 | 1.37 | 1.02 | 4.10 | 0.36 |
| Discharge capacity[Ah] | 56.9 | 56.5 | 56.8 | 58.1 | 58.5 |
| Output characteristics[%] | 89 | 88 | 89 | 88 | 91 |
| Input characteristics[%] | 77 | 75 | 78 | 69 | 82 |
| Cycle life characteristics[%] | 79 | 77 | 80 | 76 | 80 |
| Safety | A | A | A | A | B |

As shown in Examples 1 to 12 of the present invention, in a case which includes a lithium-nickel-manganese-cobalt composite oxide having a layered crystal structure as the positive electrode active material and an easily graphitizable carbon as the negative electrode active material and the case in which the weight of the easily graphitizable carbon at 550° C. in air flow in thermogravimetric analysis is equal to or more than 75% of the weight of the easily graphitizable carbon at 25° C. while the weight of the easily graphitizable carbon at 650° C. is equal to or less than 20% of the weight of the easily graphitizable carbon at 25° C., it has been found that the input characteristics is equal to or more than 90% and that the output characteristics is equal to or more than 80%. Additionally, the excellent results of the cycle life characteristics and the safety can be also obtained.

On the other hand, it has been found that, in a case in which the weight of the easily graphitizable carbon at 550° C. in air flow in thermogravimetric analysis is less than 75% of the weight of the easily graphitizable carbon at 25° C. or a case in which the weight of the easily graphitizable carbon at 650° C. exceeds 20% of the weight of the easily graphitizable carbon at 25° C. (comparative examples 1 to 3), it has been found that, although the safety is favorable, the input characteristics and the cycle life characteristics are reduced.

When Examples 1 to 12 are compared to comparative examples 1 to 3, it has been found that the specific surface area in each of the examples is large while the value of the $CO_2$ adsorption amount is low. From this, it is presumed that the contact area with the electrolyte solution becomes larger as the specific surface area is larger, and thus, the reaction rate is advanced. Further, it is presumed that the small $CO_2$ adsorption amount suppresses the film formation on the surface of the active material and the decomposition of the electrolyte solution, and thus, this contributes to improvement of the input/output characteristics and the battery life.

Further, in the battery of the comparative example 4 using the hardly graphitizable carbon as the negative electrode active material, it has been found that the output characteristics and the cycle life characteristics are reduced. It is thought that the irreversible capacity of the hardly graphitizable carbon tends to increase, and thus, the output characteristics and the cycle life are reduced.

Further, in the battery of the comparative example 5 using the graphite as the negative electrode active material, the explosion of the battery container has been found, and thus, the battery was poor in the safety. It is considered that the volume change of the graphite due to entering and leaving of the lithium ions is larger than that of the amorphous carbon, and thus, the carbon structure is easily collapsed, and the safety and the cycle life characteristics were reduced.

INDUSTRIAL APPLICABILITY

According to the present invention, a lithium ion battery excellent in the input characteristics, the output characteristics, the battery life characteristics, and the safety can be obtained.

Further, the application place of the lithium ion battery explained in the embodiment is not limited, and the lithium ion battery may be widely used in a battery module configured by collecting a plurality of the lithium ion batteries, an automobile on which this battery module is mounted, and a power storage device on which the battery module is mounted.

EXPLANATION OF REFERENCE CHARACTERS

Positive electrode external terminal 1', Positive electrode external terminal 2, Nut 3, Ceramic washer 3', Ceramic washer 4, Battery cap 5, Battery container 6, Wound group 7, Flange 8, Insulating coating 9, Lead piece 10, Cleavage valve 11, Metal washer 12, O-ring 13, Injection port 20

The invention claimed is:

1. A lithium ion battery comprising, in a battery container:
an electrode group in which a positive electrode and a negative electrode are disposed through a separator; and
an electrolyte solution,
wherein a lithium-nickel-manganese-cobalt composite oxide having a layered crystal structure is contained as a positive electrode active material,
an easily graphitizable carbon is contained as a negative electrode active material,
a weight of the negative electrode active material heated at 550° C. in dry air flow in thermogravimetric analysis is equal to more than 75% of a weight of the negative electrode active material heated at 25° C. therein, and
a weight of the negative electrode active material heated at 650° C. in dry air flow in thermogravimetric analysis is equal to or less than 20% of the weight of the negative electrode active material heated at 25° C. therein.

2. The lithium ion battery according to claim 1,
wherein, in the easily graphitizable carbon, a median particle diameter (d50) on volumetric basis as measured with a laser diffraction particle size distribution meter is from 5 μm to 30 μm, a specific surface area as obtained by a nitrogen adsorption measurement method is from 1.0 m2/g to 5.0 m2/g, and a carbon dioxide adsorption amount until a relative pressure of 0.03 (at 273 K) is from 0.01 cm3/g to 4.0 cm3/g.

3. The lithium ion battery according to claim 2,
wherein the specific surface area as obtained by the nitrogen adsorption measurement method is from 1.3 m2/g to 4.0 m2/g.

4. The lithium ion battery according to claim 2,
wherein the carbon dioxide adsorption amount until the relative pressure of 0.03 (at 273 K) is from 0.05 cm3/g to 1.5 cm3/g.

5. A negative electrode for a lithium ion battery,
wherein an easily graphitizable carbon is contained as a negative electrode active material,
a weight of the negative electrode active material heated at 550° C. in dry air flow in thermogravimetric analysis is equal to or more than 75% of a weight of the negative electrode active material heated at 25° C. therein, and
a weight of the negative electrode active material heated at 650° C. therein is equal to or less than 20% of the weight of the negative electrode active material heated at 25° C. therein.

6. A lithium ion battery comprising a negative electrode for the lithium ion battery according to claim 5.

7. A battery module configured by collecting a plurality of the lithium ion batteries according to claim 1.

8. An automobile on which the battery module according to claim 7 is mounted.

9. A power storage device on which the battery module according to claim 7 is mounted.

* * * * *